US012608280B1

(12) United States Patent　　(10) Patent No.:　US 12,608,280 B1
Gong et al.　　　　　　　　　　(45) Date of Patent:　　Apr. 21, 2026

(54) SNAPSHOT CREATION FOR PERSISTENT VOLUMES

(71) Applicant: International Business Machines Corporation, Armonk, NY (US)

(72) Inventors: Wei Gong, Beijing (CN); Gang Lyu, Shanghai (CN); Yun Feng Ma, Beijing (CN); Jing Zhao, Beijing (CN); Fang Yuan Cheng, Beijing (CN); Fu Long Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/000,307

(22) Filed: Dec. 23, 2024

(51) Int. Cl.
*G06F 11/14*　　　(2026.01)
*G06F 11/1446*　　(2026.01)

(52) U.S. Cl.
CPC ...... *G06F 11/1458* (2013.01); *G06F 2201/84* (2013.01)

(58) Field of Classification Search
CPC .......................... G06F 11/1458; G06F 2201/84
See application file for complete search history.

(56) References Cited

U.S. PATENT DOCUMENTS

| | | | |
|---|---|---|---|
| 9,952,767 | B2 | 4/2018 | Zheng et al. |
| 10,235,222 | B2 | 3/2019 | Jobi et al. |
| 10,963,349 | B2 | 3/2021 | Dhamdhere et al. |
| 11,048,590 | B1 * | 6/2021 | Sapuntzakis ............ G06F 3/065 |

| | | | |
|---|---|---|---|
| 11,089,105 | B1 * | 8/2021 | Karumbunathan ... G06F 16/275 |
| 11,269,543 | B2 | 3/2022 | Kumarasamy et al. |
| 11,556,372 | B2 | 1/2023 | Dontu et al. |
| 12,135,885 | B2 * | 11/2024 | Cain ..................... G06F 3/0664 |
| 2021/0149769 | A1 | 5/2021 | Balcha et al. |
| 2022/0197567 | A1 | 6/2022 | Litke et al. |
| 2022/0198054 | A1 * | 6/2022 | Picos ....................... G06N 5/04 |
| 2022/0263897 | A1 * | 8/2022 | Karr ................... G06F 11/1448 |

(Continued)

FOREIGN PATENT DOCUMENTS

| | | |
|---|---|---|
| CN | 115061856 B | 11/2022 |
| WO | 2024102135 A1 | 5/2024 |

OTHER PUBLICATIONS

"Enable Snapshot Functionality for CSI Volumes", Amazon EKS, retrieved from web dated Sep. 26, 2024, 3 pages.

(Continued)

*Primary Examiner* — Merilyn P Nguyen
(74) *Attorney, Agent, or Firm* — Zilka-Kotab, P.C.

(57)　　　　　　ABSTRACT

A method, in one approach, includes causing a persistent volume list for application services in a container orchestration system to be maintained, and in response to receiving a request from a first application to create a snapshot of persistent volumes in a first application service, identifying, within the persistent volume list, drivers which maintain the persistent volumes belonging to the first application service. The method further includes causing the identified drivers to create snapshots of the persistent volumes belonging to the first application service, recording a time that the snapshots for the persistent volumes belonging to the first application service are complete, and sending a first notification to the first application to acknowledge fulfillment of the request. The first notification indicates the recorded time.

20 Claims, 6 Drawing Sheets

(56) References Cited

U.S. PATENT DOCUMENTS

| | | | |
|---|---|---|---|
| 2024/0176529 A1* | 5/2024 | Dawe ................... | G06F 3/0665 |
| 2025/0298656 A1* | 9/2025 | Venkatanarayanan ....................... | |
| | | | G06F 9/4856 |

OTHER PUBLICATIONS

"Kubernetes", Wikipedia, retrieved from web dated Feb. 19, 2025, 24 pages, https://en.wikipedia.org/wiki/Kubernetes.

"What is a Kubernetes Pod?", Red Hat, Oct. 31, 2017, 7 pages, https://www.redhat.com/en/topics/containers/what-is-kubernetes-pod#:~:text=A%20Kubernetes%20pod%20is%20a,a%20more%20common%20use%20case).

Couwenbergh Sofie. "The Importance of Cleaning Dirty Data for Improved Operations and Customer Success", Validity, Aug. 24, 2022, 14 pages, https://www.validity.com/blog/dirty-data/.

\* cited by examiner

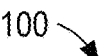

100

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

SNAPSHOT CREATION CODE

150

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

FIG. 1

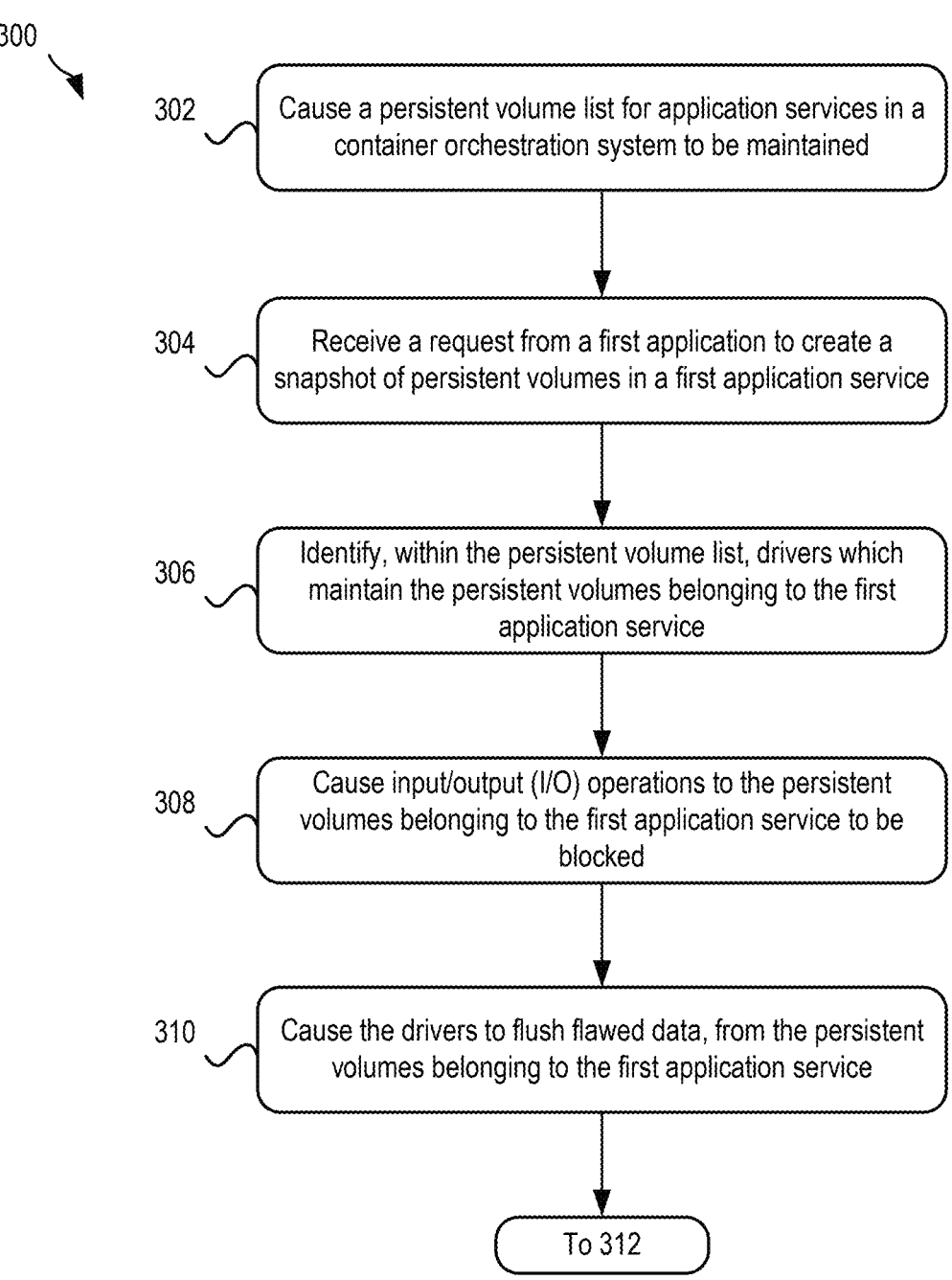

300

302 Cause a persistent volume list for application services in a container orchestration system to be maintained 304 Receive a request from a first application to create a snapshot of persistent volumes in a first application service 306 Identify, within the persistent volume list, drivers which maintain the persistent volumes belonging to the first application service 308 Cause input/output (I/O) operations to the persistent volumes belonging to the first application service to be blocked 310 Cause the drivers to flush flawed data, from the persistent volumes belonging to the first application service To 312

FIG. 3

300
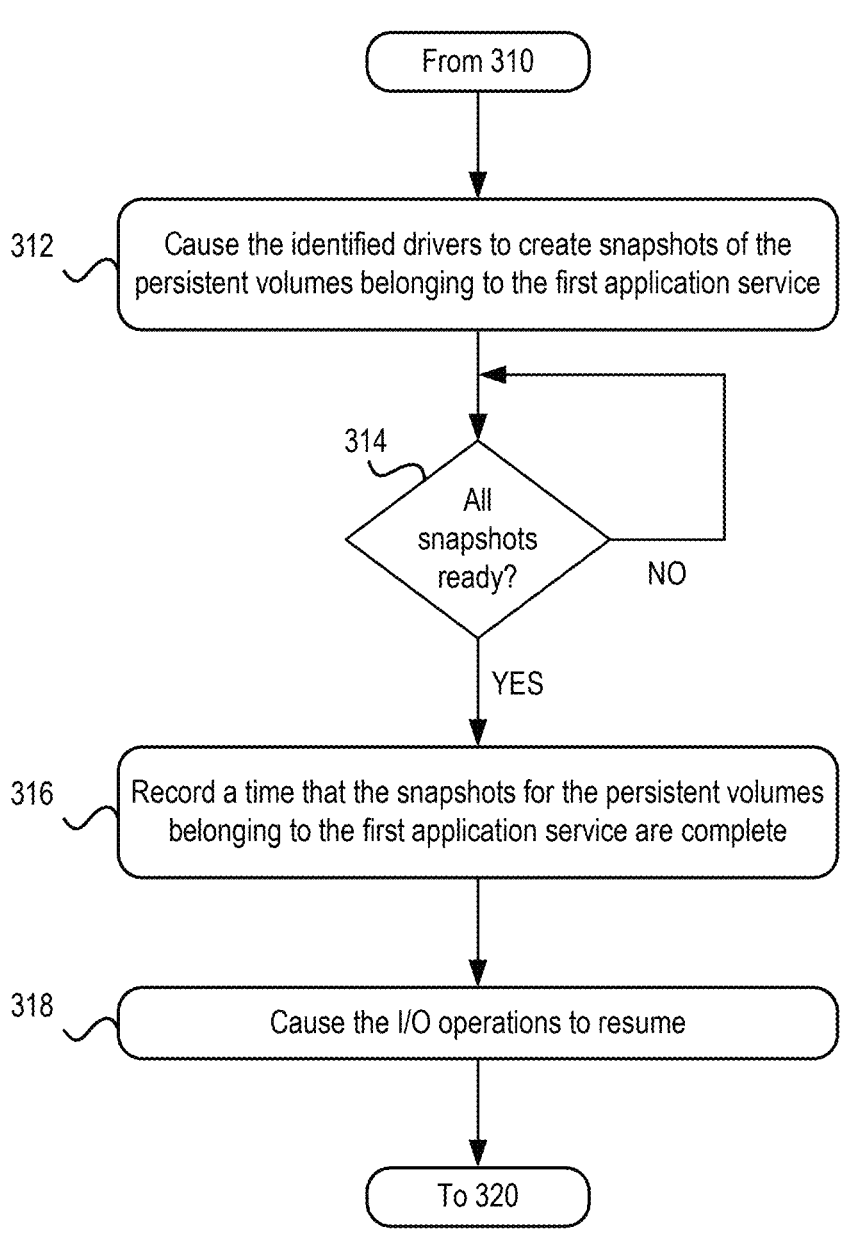
From 310
312     Cause the identified drivers to create snapshots of the persistent volumes belonging to the first application service
314     All snapshots ready?
NO
YES
316     Record a time that the snapshots for the persistent volumes belonging to the first application service are complete
318     Cause the I/O operations to resume
To 320
FIG. 3
(continued)

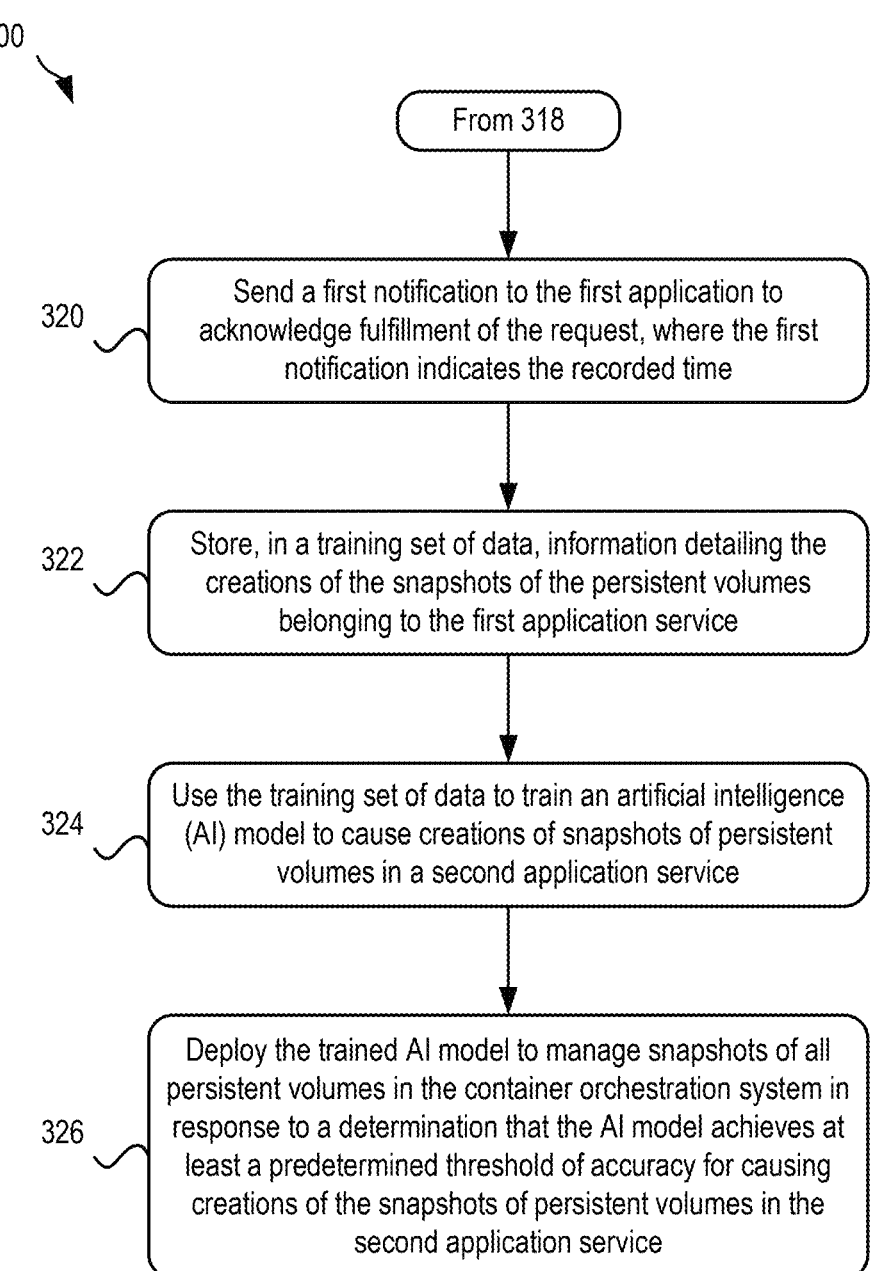

300

From 318

320 — Send a first notification to the first application to acknowledge fulfillment of the request, where the first notification indicates the recorded time 322 — Store, in a training set of data, information detailing the creations of the snapshots of the persistent volumes belonging to the first application service 324 — Use the training set of data to train an artificial intelligence (AI) model to cause creations of snapshots of persistent volumes in a second application service 326 — Deploy the trained AI model to manage snapshots of all persistent volumes in the container orchestration system in response to a determination that the AI model achieves at least a predetermined threshold of accuracy for causing creations of the snapshots of persistent volumes in the second application service

FIG. 3
(continued)

SNAPSHOT CREATION FOR PERSISTENT VOLUMES

BACKGROUND

The present invention relates to container orchestration system, and more specifically, this invention relates to snapshots.

An application service in a container orchestration system, e.g., such as Kubernetes which is also referred to as a "K8S system") may include several pods. For context, a pod may be defined as a collection of one or more containers, e.g., such as LINUX containers, and is the smallest unit of a Kubernetes application. Any given pod can be composed of multiple, tightly coupled containers (an advanced use case) or just a single container (a more common use case). One use case example of an application service in a container orchestration system that includes several pods includes a blog system which may use a database pod, and blog engine pod.

Some deployments of pods, such as pods run in Kubernetes, need persistent storage to store data. There may be several persistent volumes (also referred to herein as "PV") attached for a pod, where the PVs may have different performance and/or capability requirements. For example, some messaging solutions need a data PV and a log PV which have different performance and capacity requirements. In order to create snapshot for the whole service as a checkpoint to protect data, a snapshot needs to be created for all the PVs that belong to the service. To perform such a snapshot, all PVs attached to applications associated with the service need to have a snapshot performed at the same checkpoint time to give a consistent view from the service perspective. Otherwise performing snapshots at different checkpoint times prevents the application service from being restored properly from the snapshot.

SUMMARY

A method, in one approach, includes causing a persistent volume list for application services in a container orchestration system to be maintained, and in response to receiving a request from a first application to create a snapshot of persistent volumes in a first application service, identifying, within the persistent volume list, drivers which maintain the persistent volumes belonging to the first application service. The method further includes causing the identified drivers to create snapshots of the persistent volumes belonging to the first application service, recording a time that the snapshots for the persistent volumes belonging to the first application service are complete, and sending a first notification to the first application to acknowledge fulfillment of the request. The first notification indicates the recorded time.

A computer program product, in another approach, includes one or more computer-readable storage media, and program instructions stored on the one or more storage media to perform any combination of features of the foregoing methodology.

A computer system, in another approach, includes a processor set, one or more computer-readable storage media, and program instructions stored on the one or more storage media to cause the processor set to perform any combination of features of the foregoing methodology.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach of the present invention.

FIG. 3 is a flowchart of a method, in accordance with one approach of the present invention.

DETAILED DESCRIPTION

Figure 2:
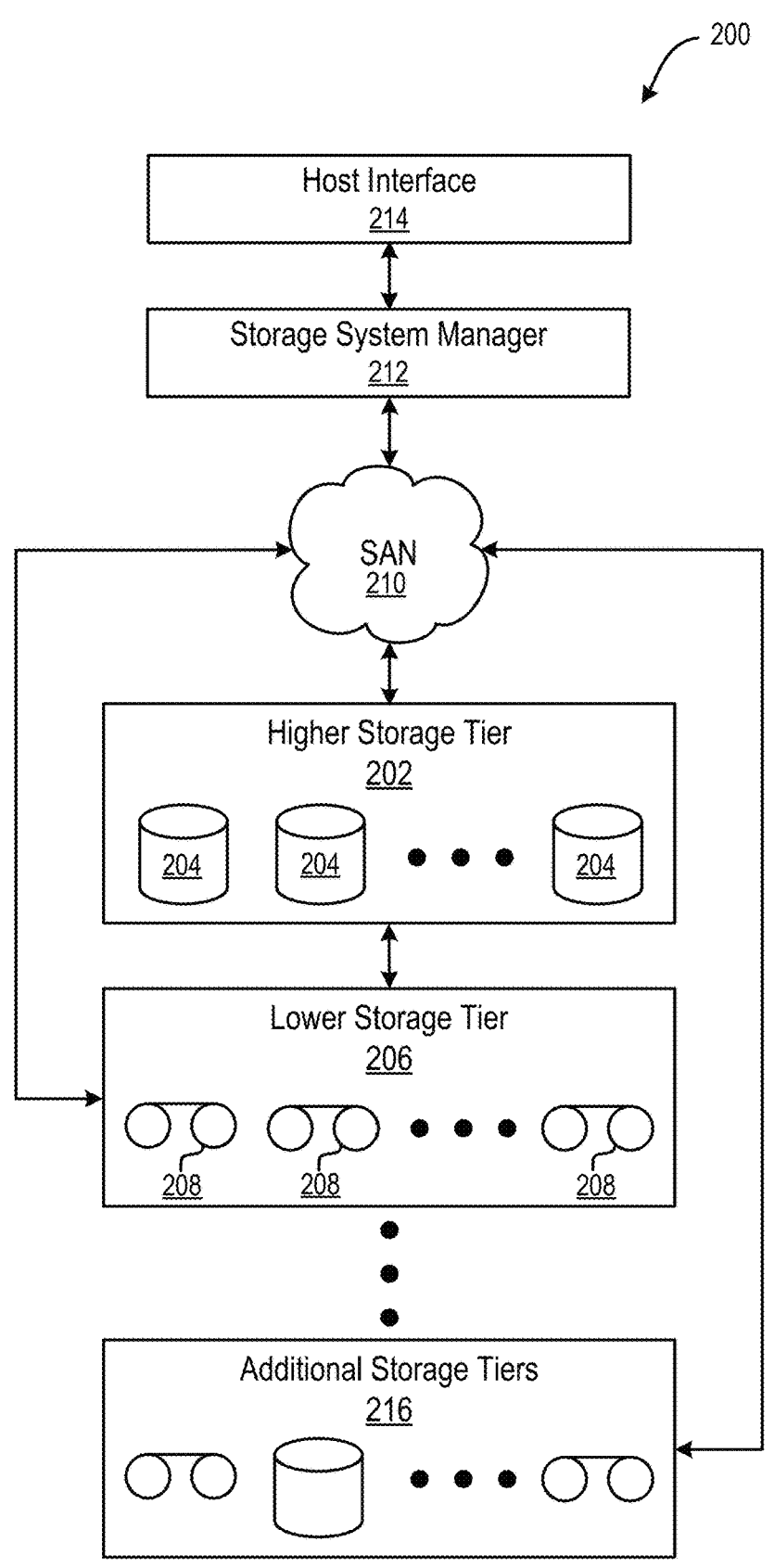
FIG. 2 is a diagram of a tiered data storage system, in accordance with one approach of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for snapshot creation for persistent volumes in a data storage architecture.

In one general approach, a method includes causing a persistent volume list for application services in a container orchestration system to be maintained, and in response to receiving a request from a first application to create a snapshot of persistent volumes in a first application service, identifying, within the persistent volume list, drivers which maintain the persistent volumes belonging to the first application service. The method further includes causing the identified drivers to create snapshots of the persistent volumes belonging to the first application service, recording a time that the snapshots for the persistent volumes belonging to the first application service are complete, and sending a first notification to the first application to acknowledge fulfillment of the request. The first notification indicates the recorded time.

A technical effect of sending the first notification to the first application to acknowledge fulfillment of the request includes providing the first application with time information that allowed the requested snapshot to thereafter be used, e.g., in the event that the snapshot is to be used for failover recovery purposes.

The requested snapshot of persistent volumes in the first application service may comprise a combination of the snapshots of the persistent volumes belonging to the first application service created by the drivers. A first subset of the persistent volumes belonging to the first application service may exist across a plurality of different storage tiers on a first storage system, and a second subset of the persistent volumes belonging to the first application service may exist on a second storage system.

A technical effect of using the drivers to capture different sub-portions of the requested snapshot, where the persistent volumes are located across different storage systems, includes a division of the creation steps to establish the requested snapshot. More specifically, by causing the drivers that maintain the persistent volumes to pause I/O operations and together create the snapshots, the requested snapshot is able to be created at a common time by each of the drivers.

The method may further comprise causing input/output (I/O) operations to the persistent volumes belonging to the first application service to be blocked during the creations of the snapshots of the persistent volumes belonging to the first application service, and in response to a determination that the snapshots for the persistent volumes belonging to the first application service are complete, causing the I/O operations to resume.

A technical effect of pausing, e.g., via blocking, I/O operations during creation of snapshots of the persistent volumes belonging to the first application service includes the enablement of a single state of the data stored on the persistent volumes to be captured. More specifically, because, in some approaches, at least some of the snapshots may take more time to create by some drivers than other snapshots created by other drivers, otherwise allowing I/O operations to be performed during creation of snapshots may cause different versions of data stored on the persistent volumes to be captured. A technical effect of causing the I/O operations to resume in response to a determination that the snapshots for the persistent volumes belonging to the first application service are complete includes enablement of throughput of the data storage systems to increase by returning data storage functionality returning to an operational state.

The method may further comprise causing the drivers to flush flawed data, from the persistent volumes belonging to the first application service, prior to creating the snapshots of the persistent volumes. The flawed data may include (be selected from) one or more of inaccurate data, inconsistent data, incomplete data and data set to be erased.

A technical effect of flushing flawed data from the persistent volumes belonging to the first application service includes a reduction of an overall storage size of the snapshots, as relatively less data is being captured in the snapshots. Furthermore, in some approaches, flushing the flawed data has a technical effect of preventing data that currently exists in the persistent volumes, but is scheduled to be erased from the persistent volumes (or is at least in a state that meets predetermined criteria for being erased) from being captured in created snapshots. In the event that such snapshots are processed thereafter, e.g., for failover purposes, the flushing also relatively reduces an amount of data that is processed by computer devices to perform the failover.

The drivers may be caused to flush the flawed data from the persistent volumes belonging to the first application service until a predetermined condition is met. The predetermined condition may include an amount of buffered data in the container orchestration system falling below a predefined threshold and/or a timeout threshold being reached.

A technical effect of applying predetermined conditions to the flushing of flawed data includes the creation of snapshots of the persistent volumes belonging to the first application service being suspended until predetermined preferred conditions exist. More specifically, in some approaches, these predetermined preferred conditions include relatively less processing resources being expended to create the snapshots than would otherwise be expended if the condition(s) were not first met. This preservation of processing resources mitigates latency within the container orchestration system.

The method may further comprise sending a second notification to the first application in response to a determination that a first of the snapshots of a first of the persistent volumes belonging to the first application service fails to be created. The second notification may detail the failure to complete the snapshot of the first persistent volume. The method may further comprise performing a mitigating action to correct the failure.

A technical effect performing the mitigating action includes increasing an amount of flawed data that is flushed from the persistent volumes belonging to the first application service prior to creating the snapshots. By flushing additional flawed data in a subsequent attempt to create the snapshot, an amount of processing that is expended in creating the snapshot is reduced. Other mitigating actions also have a technical effect of reducing an amount of processing that the driver (that previously failed to successfully create the snapshot) performs and/or change the driver that creates the snapshot in a subsequent attempt to create the snapshot.

The mitigating action may include one or more of increasing a flush timeout, allocating additional time to a predetermined threshold of time that snapshots of the first persistent volume are to be created in, recovering data of the first persistent volume, and migrating data of the first persistent volume to a second of the persistent volumes belonging to the first application service.

As mentioned elsewhere above, a technical effect performing the mitigating action includes increasing an amount of flawed data that is flushed from the persistent volumes belonging to the first application service prior to creating the snapshots. By flushing additional flawed data in a subsequent attempt to create the snapshot, an amount of processing that is expended in creating the snapshot is reduced. Other mitigating actions also have a technical effect of reducing an amount of processing that the driver (that previously failed to successfully create the snapshot) performs and/or change the driver that creates the snapshot in a subsequent attempt to create the snapshot.

The causing the persistent volume list for application services in the container orchestration system to be maintained may include instructing a persistent volume list manager component to observe and document data operations that occur on the persistent volumes in the first application service. A storage abstract layer run on top of a storage vendor's driver may include the persistent volume list manager component. The application services may be configured to perform maintenance operations on persistent volumes belonging to the application services, where the persistent volumes belonging to the application services, include the persistent volumes in the first application service. The maintenance operations may include one or more of initializing, adding, deleting, and modifying.

A technical effect of causing the persistent volume list for application services in the container orchestration system to be maintained includes the enablement of a list that can be referenced to determine how to simultaneously perform snapshots within a data storage system that is distributed and/or included components associated with different vendors. More specifically, the list enables mapping of persistent volumes of application services to drivers. This way, the drivers that need to be instructed to perform operations with respect to the persistent volumes remain known over time.

The method may further comprise storing, in a training set of data, information detailing the creations of the snapshots of the persistent volumes belonging to the first application service, and using the training set of data to train an artificial intelligence (AI) model to cause creation of snapshots of persistent volumes in a second application service. Furthermore, the method may comprise deploying the trained AI model to manage snapshots of all persistent volumes in the container orchestration system in response to a determination that the AI model achieves at least a predetermined threshold of accuracy for causing creations of the snapshots of persistent volumes in the second application service.

A technical effect of using the trained AI model to manage snapshots of all persistent volumes in the container orchestration system includes a reduction in error introduction in snapshot creation, as well as increased processing efficiencies within the container orchestration system. For example, the trained AI model ensures that snapshots across different data storage systems and storage tiers are performed at the same time, where the scale of such instruction, analysis and determinations would not otherwise be feasible for a human to perform. This is because humans are not able to efficiently manage a plurality of storage systems (much less create snapshots of data storage systems to begin with), and would otherwise incorporate processing delays and errors in recordation of states of a data storage system in the process of attempting to do so.

In another general approach, a computer program product includes one or more computer-readable storage media, and program instructions stored on the one or more storage media to perform any combination of features of the foregoing methodology. Similar technical effects are obtained.

In another general approach, a computer system includes a processor set, one or more computer-readable storage media, and program instructions stored on the one or more storage media to cause the processor set to perform any combination of features of the foregoing methodology. Similar technical effects are obtained.

In one general approach, a method includes causing a persistent volume list for application services in a container orchestration system to be maintained, and in response to receiving a request from a first application to create a snapshot of persistent volumes in a first application service, identifying, within the persistent volume list, drivers which maintain the persistent volumes belonging to the first application service. The method further includes causing the identified drivers to create snapshots of the persistent volumes belonging to the first application service, recording a time that the snapshots for the persistent volumes belonging to the first application service are complete, and sending a first notification to the first application to acknowledge fulfillment of the request. The first notification indicates the recorded time and the requested snapshot of persistent volumes in the first application service comprises a combination of the snapshots of the persistent volumes belonging to the first application service created by the drivers.

A technical effect of using the drivers to capture different sub-portions of the requested snapshot includes a division of the creation steps to establish the requested snapshot. Furthermore, the requested snapshot is not created with delays and is created without adherence to different clocks which would otherwise introduce errors into the snapshot process.

In one preferred use case of the invention, a request from a first application to create a snapshot of persistent volumes in a first application service is fulfilled in a data storage architecture in which a first subset of the persistent volumes belonging to the first application service exist across a plurality of different storage tiers on a first storage system, and a second subset of the persistent volumes belonging to the first application service exist on a second storage system. This use case provides an example of how the efficient and accurate snapshots techniques described herein are able to be deployed in a data storage architecture that includes a plurality of different storage vendors.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as snapshot creation code of block 150 for snapshot creation for persistent volumes in a data storage architecture. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

Now referring to FIG. 2, a storage system 200 is shown according to one approach. Note that some of the elements shown in FIG. 2 may be implemented as hardware and/or software, according to various approaches. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a SAN, as shown in FIG. 2, Internet Protocol (IP) network, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the approaches presented herein.

According to some approaches, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

As mentioned elsewhere herein, an application service in a container orchestration system, e.g., such as Kubernetes which is also referred to as a "K8S system") may include several pods. For context, a pod may be defined as a collection of one or more containers, e.g., such as LINUX containers, and is the smallest unit of a Kubernetes application. Any given pod can be composed of multiple, tightly coupled containers (an advanced use case) or just a single container (a more common use case). One use case example of an application service in a container orchestration system that includes several pods includes a blog system which may use a database pod, and blog engine pod.

Some deployments of pods, such as pods run in Kubernetes, need persistent storage to store data. There may be several persistent volumes (also referred to herein as "PV") attached for a pod, where the PVs may have different performance and/or capability requirements. For example, some messaging solutions need a data PV and a log PV which have different performance and capacity requirements. In order to create snapshot for the whole service as a checkpoint to protect data, a snapshot needs to be created for all the PVs that belong to the service. To perform such a snapshot, all PVs attached to applications associated with the service need to have a snapshot performed at the same checkpoint time to give a consistent view from the service perspective. Otherwise performing snapshots at different checkpoint times prevents the application service from being restored properly from the snapshot.

Depending on the use case, different persistent volumes of a plurality of persistent volumes may belong to different storage classes (also referred to herein as different "storage tiers") due to different performance or capability requirements. For example, data of a second persistent volume for a second pod may be stored in a first storage tier, e.g., storage class 1, which has relatively higher performance, while a fifth persistent volume for the second pod, based on data of the fifth persistent volume may be stored in and accessed from a third storage tier, e.g., storage class 3, which has relatively lower performance. To create a snapshot for an application service in a container orchestration system, and more specifically K8S, a storage system needs to implement advanced snapshot features for a group of persistent volumes across multiple storage systems, which may originate from different vendors. However, because persistent volumes are often located across multiple storage systems, vendors and storage tiers (of different capabilities), delays and adherence to different clocks introduce errors into snapshots. More specifically, conventional container orchestration systems fail to include such snapshot capabilities that account for persistent volumes being stored across multiple storage systems, vendors and storage tiers.

Use command line interfaces (CLIs) to create a snapshot for persistent volumes from different storage systems at the same time is not a viable solution to the inefficiencies described above because it cannot be assumed that a plurality of snapshot components used to perform snapshots on the different persistent volumes will create snapshots at the same time. This is because some high performance storage systems can create snapshots relatively faster than low performance storage systems.

Placement of a plurality of persistent volumes in from the application service into the same consistent group and then creating a snapshot for the consistent group is also not a viable solution to the inefficiencies described above. This is because persistent volumes of an application service may come from different storage vendors which have different implementations for the consistent group. Furthermore, this is based on the fact that it is hard or even impossible to combine consistent groups from different storage vendors into one consistent group.

The description above detail that there is no obvious solution to the deficiencies described above with respect to creating a snapshot for persistent volumes from different storage systems at the same time. In sharp contrast to the deficiencies described above, techniques of approaches described herein introduce non-obvious techniques for creating a snapshot for persistent volumes from different storage systems at the same time. These techniques, in some preferred approaches, work with a storage abstract layer with several components run on top of a storage vendor's driver, e.g., Container Storage Interface (CSI) driver. One of the components of the storage abstract layer includes a persistent volume list manager which may manage, or be caused (instructed) to manage, a persistent volume list for each application service. An application service can perform maintenance operations on persistent volumes that belong to the application service, e.g., initialize, add, delete, modify, etc. When an application wants to create a snapshot for any persistent volume in this application service, these techniques furthermore, in some approaches, include causing the abstract layer to identify the persistent volume list and go through all persistent volumes in the list. Then, all drivers (CSI drivers) that are determined to maintain persistent volumes belonging to this application service are involved, e.g., instructed, to create snapshots for related persistent volumes in the list.

The storage abstract layer preferably additionally includes a snapshot customer resource global monitor controller that works together with all of the determined drivers to collaborate the snapshot creation procedure. For example, this collaboration includes suspending and thereafter resuming I/O operations when needed in order to allow these snapshots to be captured. The snapshot customer resource global monitor controller may, in some approaches, monitor all custom resources (CR) in each of the determined drivers to make sure that all persistent volumes flush "dirty data" (hereafter also referred to herein as "flawed data"), record a time of the snapshot, and then call an API to resume write I/O for all persistent volumes. The snapshot customer resource global monitor controller then sends acknowledgement information to the application service detailing that the snapshot creation has been completed in the recorded time. The recorded time is thereby able to be used as the snapshot checkpoint time for the application, despite the application using persistent volume(s) across various storage systems.

Now referring to FIG. 3, a flowchart of a method 300 is shown according to one approach. The method 300 may be performed in accordance with aspects of the present invention in any of the environments depicted in FIGS. 1-4, among others, in various approaches. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various approaches, the method 300 may be partially or entirely performed by a processing circuit associated with a storage abstract layer, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 may be performed with respect to a container orchestration system that operates with respect to a data storage infrastructure. The data storage infrastructure may include a plurality of storage systems that each include one or more storage classes. The storage classes may include one or more storage volumes. Application services may also be offered within the data storage infrastructure. For example, these application services may include one or more pods (each including a group of one or more containers), where the pods have, e.g., operate by using, one or more associated persistent volumes. In some approaches, the application services are configured to perform maintenance operations on persistent volumes belonging to the application services. The maintenance operations in some approaches include initializing. In some other approaches, the maintenance operations additionally and/or alternatively include adding. In some other approaches, the maintenance operations additionally and/or alternatively include deleting. In yet some other approaches, the maintenance operations additionally and/or alternatively include modifying. The persistent volumes belonging to the application services may include the persistent volumes in (used by) a first application service, the persistent volumes in a second application service, the persistent volumes in a third application service, and so on and so forth. The data storage infrastructure, in some preferred approaches, additionally includes drivers, e.g., CSI drivers, and a storage abstract layer. More specifically, in some approaches, a storage abstract layer run on top of a storage vendor's driver includes the persistent volume list manager component. The storage abstract layer may additionally and/or alternatively include the processing circuit associated with the storage abstract layer. The processing circuit may, in some approaches, include the manager and/or controller components mentioned elsewhere above.

Figure 4:
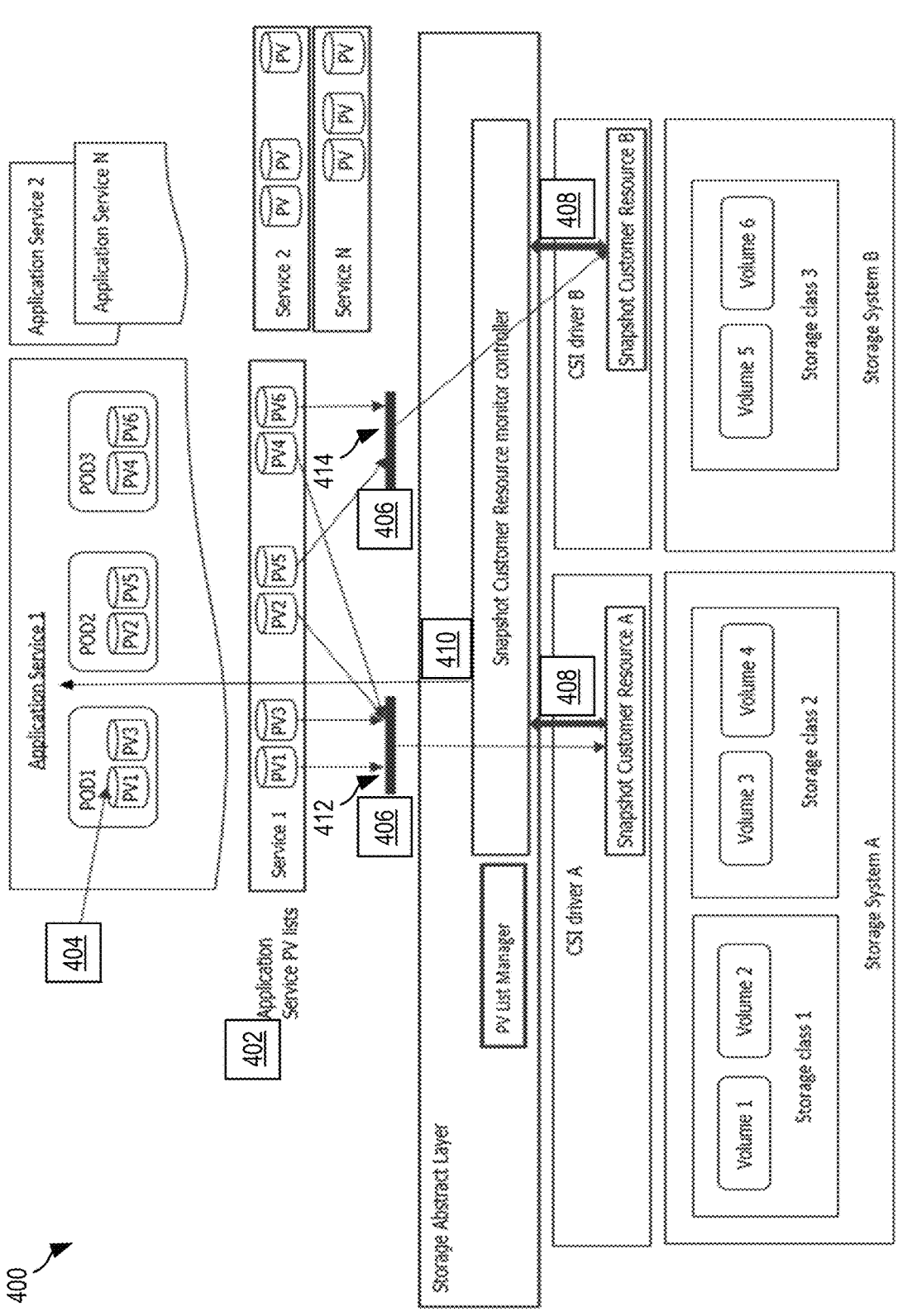
FIG. 4 is a data storage infrastructure diagram, in accordance with one approach of the present invention.

The data storage infrastructure is, in some approaches, described in greater detail elsewhere herein, e.g., see FIG. 4.

Monitoring for I/O operations may be performed within the data storage infrastructure. In some approaches, this monitoring may be performed using techniques that would become apparent to one of ordinary skill in the art after reading the descriptions herein. Based on this monitoring, a list of a state of the data storage resources, and uses thereof, may be maintained. For example, method 300 includes causing a persistent volume list for application services in a container orchestration system to be maintained, e.g., see operation 302.

The causing the persistent volume list for application services in the container orchestration system to be maintained, in some approaches, comprises instructing a persistent volume list manager component to observe and document data operations (I/O operations) that occur on the persistent volumes in the first application service. In some approaches, these data operations include data operations performed by an application service on persistent volumes that currently belong (assigned and/or used by) to the application services. Various examples of these data operations include initializing a persistent volume, adding data to a persistent volume, deleting a persistent volume, deleting data from a persistent volume, modifying a persistent volume in any way, etc.

In order to protect data stored within the data storage infrastructure, snapshots may ongoingly be performed with respect to a state of storage resources of the data storage infrastructure. More specifically, snapshots of persistent volumes of the data storage infrastructure may be pursued for one or more reasons, e.g., for fallback purposes in the event of a failure event, to use for performing troubleshooting in the event that software compatibility issues result from an update being performed, for training an artificial intelligence (AI) model, to document events (I/O operations) performed within the data storage infrastructure, etc. In some approaches, performance of such snapshots is initiated in response to a predetermined about of time elapsing, e.g., periodically. In some other approaches, snapshots may be created in response to receiving a request to do so. For example, operation 304 includes receiving a request from a first application to create a snapshot of persistent volumes in a first application service.

In response to receiving the request from the first application to create the snapshot of the persistent volumes in the first application service, method 300, in some approaches, includes identifying, within the persistent volume list, drivers which maintain the persistent volumes belonging to the first application service, e.g., see operation 306. Note that the drivers may include drivers of a type that would become apparent to one of ordinary skill in the art after reading the descriptions herein. For example, in one of such approaches, at least some of the drivers may be CSI drivers.

In some approaches, identifying, within the persistent volume list, the drivers which maintain the persistent volumes belonging to the first application service may include auditing log information stored in the persistent volume list to determine which divers have performed maintenance operations on persistent volumes. In some approaches, the audit may be performed with respect to one or more audit conditions. For example, a first of the audit conditions may specify a predetermined period of time that the maintenance operations must have been previously performed within. In some other approaches, a second of the audit conditions may specify a number of maintenance operations that a given one of the drivers have had to perform in order to be identified as one of the drivers that maintain the persistent volumes in the first application service. In yet some other approaches, a third of the audit conditions may specify that the drivers must have at least a predetermined type of credential in order to be identified as one of the drivers that maintain the persistent volumes in the first application service.

In some approaches, in order to enable the identified drivers to create snapshots of the persistent volumes belonging to the first application service, I/O operations may be, at least temporarily, paused to allow a current state of the persistent volumes belonging to the first application service to be captured. A technical effect of pausing, e.g., via blocking, I/O operations during creation of snapshots of the persistent volumes belonging to the first application service includes the enablement of a single state of the data stored on the persistent volumes to be captured. More specifically, because, in some approaches, at least some of the snapshots may take more time to create by some drivers than other snapshots created by other drivers, otherwise allowing I/O operations to be performed during creation of snapshots may cause different versions of data stored on the persistent volumes to be captured. Accordingly, in some approaches, method 300 includes causing I/O operations to the persistent volumes belonging to the first application service to be blocked during the creations (by the different drivers) of the snapshots of the persistent volumes belonging to the first application service, e.g., see operation 308. In some approaches, the blocking occurs based on an instruction being issued to the CSI drivers by a component of the data storage infrastructure performing the operations of method 300, e.g., a component of the storage abstract layer.

In some approaches, flawed data may be flushed from persistent volumes prior to causing creation of one or more of the snapshots. For example, in one approach, method 300 includes causing the drivers to flush flawed data, from the persistent volumes belonging to the first application service, prior to creating the snapshots of the persistent volumes, e.g., see operation 310. For context, the definition of flawed data may depend on the approach. In one example, the flawed data includes inaccurate data. In another approach, the flawed data may additionally and/or alternatively include inconsistent data. In another approach, the flawed data may additionally and/or alternatively include incomplete data. In yet another approach, the flawed data may additionally and/or alternatively include data set to be erased. In some approaches, in the context of Kubernetes, the "flawed data" may be referred to as "dirty data". This data refers to data within a Kubernetes cluster that, based on a flawed nature of the data, has a potential for causing issues with application functionality and/or management. According to some more specific approaches, the flawed data may be defined as including duplicate entries, incorrect configurations, outdated information, data that does not adhere to expected formats, etc.

It should be noted that a technical effect of flushing flawed data from the persistent volumes belonging to the first application service includes a reduction of an overall storage size of the snapshots, as relatively less data is being captured in the snapshots. Furthermore, in some approaches, flushing the flawed data has a technical effect of preventing data that currently exists in the persistent volumes, but is scheduled to be erased from the persistent volumes (or is at least in a state that meets predetermined criteria for being erased) from being captured in created snapshots. In the event that such snapshots are processed thereafter, e.g., for failover purposes, the flushing also relatively reduces an amount of data that is processed by computer devices to perform the failover.

In some approaches, predetermined conditions are applied to the flushing of flawed data. For example, in one or more of such approaches, method 300 includes causing the drivers to flush the flawed data from the persistent volumes belonging to the first application service until a predetermined condition is met. In one preferred approach, the predetermined condition includes an amount of buffered data in the container orchestration system falling below a predefined threshold. In another approach, the predetermined condition additionally and/or alternatively includes a timeout threshold being reached.

A technical effect of applying predetermined conditions to the flushing of flawed data includes the creation of snapshots of the persistent volumes belonging to the first application service being suspended until predetermined preferred conditions exist. More specifically, in some approaches, these predetermined preferred conditions include relatively less processing resources being expended to create the snapshots than would otherwise be expended if the condition(s) were not first met. This preservation of processing resources mitigates latency within the container orchestration system.

Operation 312 includes causing, e.g., instructing, the identified drivers to create snapshots of the persistent volumes belonging to the first application service. In some approaches, instructions issued to the identified drivers may include an instruction of a time to create the snapshot. In some other approaches, the instructions issued to the identified drivers may additionally and/or alternatively include an instruction to report when the creation is completed, e.g., report to a component of the storage abstract layer.

Based on knowing which drivers are creating snapshots of the persistent volumes belonging to the first application service, monitoring may be performed in order to ensure that all of the snapshots are successfully created in order to prevent an incomplete snapshot from being captured, e.g., before resuming the I/O operations and/or concluding that the snapshot of the persistent volumes in the first application service has completed. For example, decision 314 includes determining whether all of the snapshots are competed and/or whether any snapshots of the persistent volumes belonging to the first application service fails to be created. Such a determination may, in some approaches, be based on whether each of the snapshots are received, e.g., from the drivers. The determination may, in some approaches, additionally and/or alternatively be based on whether confirmations of successful completion the snapshots have been received from the drivers. In some other approaches, the determination may be based on whether all of the snapshots that are to be created have been stored in a predetermined storage location, e.g., a file.

In response to a determination that one or more of the snapshots are not ready (not yet successfully created by the driver(s)), the determination may be ongoingly made in some approaches, e.g., see "NO" logical path of decision 314. In some approaches, this ongoing determination may be performed until a predetermined timeout condition is met.

In some approaches a determination may be made that at least one of the snapshots is not ready and has failed to be created, e.g., a timeout condition is met and at least one of the snapshots is still not successfully created. In response to a determination that at least a first of the snapshots of a first of the persistent volumes belonging to the first application service fails to be created, a notification is, in some approaches, sent to the first application. The notification, in some approaches, details the failure to complete the snapshot of the first persistent volume in the first application service. A mitigating action to correct the failure may be performed, in some approaches, in order to enable the snapshot to be reattempted. The mitigating action, in some approaches, includes increasing a flush timeout that is used to control a period of time that flawed data is flushed from the persistent volumes belonging to the first application service. A technical effect of increasing the flush timeout includes thereafter increasing an amount of flawed data that is flushed from the persistent volumes belonging to the first application service prior to creating the snapshots. By flushing additional flawed data in a subsequent attempt to create the snapshot, an amount of processing that is expended in creating the snapshot is reduced. Another mitigating action that, in some approaches, may additionally and/or alternatively be performed includes allocating additional time to a predetermined threshold of time that snapshots of the first persistent volume are to be created in. In some other approaches, the mitigating action may additionally and/or alternatively include recovering data of the first persistent volume. Furthermore, the mitigating action may additionally and/or alternatively include migrating data of the first persistent volume to a second of the persistent volumes belonging to the first application service, e.g., to reduce an amount of processing that the driver (that previously failed to successfully create the snapshot) performs and/or change the driver that creates the snapshot in a subsequent attempt to create the snapshot.

In response to a determination that each of the snapshots of the persistent volumes have been created, e.g., as illustrated by the "YES" logical path of decision 314, a time that the snapshots for the persistent volumes belonging to the first application service are complete is recorded, e.g., see operation 316. In some approaches, the time that the snapshots for the persistent volumes belonging to the first application service are complete is determined based on a timestamp that the last snapshot, of the persistent volumes belonging to the first application service, was completed. In some other approaches, the time that the snapshots for the persistent volumes belonging to the first application service are complete is the time that confirmation is received from a final one of the drivers that create the snapshots.

It should be noted that the requested snapshot of persistent volumes in the first application service comprises a combination of the plurality of snapshots of the persistent volumes belonging to the first application service that are created by the drivers. In other words, each driver is caused to create a snapshot that is a sub-portion of the requested snapshot of persistent volumes in the first application service. These sub-portions of the requested snapshot may be captured by the different drivers based on the layout of a data storage system infrastructure that the container orchestration system is used in. For example, while a first subset of the persistent volumes belonging to the first application service may exist across a plurality of different storage tiers on a first storage system, a second subset of the persistent volumes belonging to the first application service exist on a second storage system, and so on and so forth. Because these persistent volumes may be located on different storage systems, the plurality of drivers are used to create the requested snapshot.

A technical effect of using the drivers to capture different sub-portions of the requested snapshot, where the persistent volumes are located across different storage systems, includes a division of the creation steps to establish the requested snapshot. More specifically, by causing the drivers that maintain the persistent volumes to pause I/O operations and together create the snapshots, the requested snapshot is able to be created at a common time by each of the drivers.

In response to a determination that the snapshots for the persistent volumes belonging to the first application service are complete, the I/O operations are caused to resume, e.g., see operation 318. The I/O operations may be caused to resume, in some approaches, by issuing an instruction to the drivers to perform any pending I/O operations and/or I/O operations subsequent the blocking being released. A technical effect of causing the I/O operations to resume in response to a determination that the snapshots for the persistent volumes belonging to the first application service are complete includes enablement of throughput of the data storage systems to increase by returning data storage functionality returning to an operational state.

Operation 320 includes sending a first notification to the first application to acknowledge fulfillment of the request, where the first notification indicates the recorded time. A technical effect of sending the first notification to the first application to acknowledge fulfillment of the request includes providing the first application with time information that allowed the requested snapshot to thereafter be used, e.g., in the event that the snapshot is to be used for failover recovery purposes.

In some approaches, operations of method 300 may be performed by an AI model. For example, operation 322 includes storing, in a training set of data, information detailing the creations of the snapshots of the persistent volumes belonging to the first application service. The information detailing the creations of the snapshots of the persistent volumes belonging to the first application service may include performance information about the different tiers of the data storage systems that the persistent volumes are located in. In some other approaches, the information may additionally and/or alternatively include an ordering in which the snapshots that the persistent volumes belonging to the first application service were created in (an ordering in which the creations were completed).

Operation 324 includes using the training set of data to train an artificial intelligence (AI) model to cause creation of snapshots of persistent volumes in a second application service. In some approaches, initial training may include reward feedback that may, in some approaches, be implemented using a subject matter expert (SME) that generally understands whether a snapshot is successfully created based on an output of the AI model during training. However, to prevent costs associated with relying on manual actions of a SME, in another approach, reward feedback may be implemented using techniques for training a BERT model, as would become apparent to one skilled in the art after reading the present disclosure.

In some approaches, a determination is made as to whether the AI model is sufficiently accurate (as a result of the training) to deploy. For example, once a determination is made that the AI model achieves a redeemed threshold of accuracy of performing the operations described herein during this training, a decision that the model is trained and ready to deploy for performing techniques and/or operations of method 300 may be performed. More specifically, in response to a determination that the AI model achieves at least a predetermined threshold of accuracy for causing creations of the snapshots of persistent volumes in the second application service, the trained AI model may be deployed to manage snapshots of all persistent volumes in the container orchestration system, e.g., see operation 326.

In some further approaches, the AI model may be a neuromyotonic AI model that may improve performance of computer devices in an infrastructure associated with data storage systems and container orchestration systems used for the data storage systems, because the neuromyotonic AI model may not need an SME and/or iteratively applied training with reward feedback in order to accurately perform operations described herein. Instead, the neuromyotonic AI model is configured to itself make determinations described in operations herein. Weight values may, in some approaches, be used by the AI reasoning model to collect and analyze information and/or feedback potentially received from customers that own data stored on the data storage systems that potentially rely on such snapshots. It should be noted that a technical effect of using the trained AI model to manage snapshots of all persistent volumes in the container orchestration system includes a reduction in error introduction in snapshot creation, as well as increased processing efficiencies within the container orchestration system. For example, the trained AI model ensures that snapshots across different data storage systems and storage tiers are performed at the same time, where the scale of such instruction, analysis and determinations would not otherwise be feasible for a human to perform. This is because humans are not able to efficiently manage a plurality of storage systems (much less create snapshots of data storage systems to begin with), and would otherwise incorporate processing delays and errors in recordation of states of a data storage system in the process of attempting to do so. Accordingly, management of operations described herein is not able to be achieved by human manual actions.

It should be noted that various approaches described herein are performed with respect to persistent volumes in a first application service. However, in some other approaches, operation(s) of method 300 may additionally and/or alternatively be performed with respect to one or more persistent volumes in a plurality of application services, e.g., concurrently, sequentially, etc.

FIG. 4 depicts a data storage infrastructure 400, in accordance with one approach. As an option, the present data storage infrastructure 400 may be implemented in conjunction with features from any other approach listed herein, such as those described with reference to the other FIGS. Of course, however, such data storage infrastructure 400 and others presented herein may be used in various applications and/or in permutations which may or may not be specifically described in the illustrative approaches listed herein. Further, the data storage infrastructure 400 presented herein may be used in any desired environment.

The data storage infrastructure 400 includes a storage abstract layer with several components run on top of a storage vendor's CSI driver. For example, one of the components includes a PV list manager component which is configured to manage a PV list for each application service, e.g., see Application Service 1, Application Service 2, and Application Service N. In some approaches, each application service can perform maintenance operations on PVs belonging to the application service, e.g., initialize, add, delete, modify, etc.

In response to receiving a request and/or making a determination that an application wants to create a snapshot for any PV in this application service, e.g., see notation 404 which illustrates PV1 and PV3 of POD1 used by Application Service 1, the abstract layer identifies the PV list and searches through all PVs in the list, e.g., see operation 402. Drivers determined to maintain the PVs are then caused to create snapshots for the application service, e.g., see operation 406 which includes the CSI drivers starting to create snapshots 412 and 414 for all the PVs of the application service mentioned in the request.

A snapshot customer resource global monitor controller is also included in the storage abstract layer, which is configured to work together with all CSI drivers to cause the collaborative snapshot creation procedure described in method 300, e.g., see operation 410. In some approaches, each of the CSI driver may be caused to stop I/O operations during creations of the snapshots, e.g., see operation 408. For example, in some approaches, the CSI drivers may be caused to call the storage system snapshot component to suspend write I/O requests, and then flush dirty data in response to receiving a snapshot creation command.

In some approaches, the snapshot customer resource global monitor controller sends the flush commands to buffers on the pods of every PV to cause flushing of the dirty data to the corresponding storage volume. In one command example specific approach, the flush command does not block I/O. A check may be performed on the metadata of a storage class to check whether an associated storage system supports flush commands. In response to a determination that the storage system does support such commands, the flush commands are sent to the corresponding storage systems to cause flushing of the dirty data in the buffers of the storage systems to disks. These flush commands may be issued using a command of a type known in the art or that would become apparent to one skilled in the art after reading the descriptions herein. In some approaches, the flush commands may be repeatedly sent until the amount of buffered data is determined to be below a predefined threshold or a timeout threshold is crossed.

After all dirty data has been flushed (a predetermined condition is determined to have been met), the CSI driver may be caused, e.g., instructed, to change the CR and wait for a specified period of time to resume the I/O requests. The snapshot customer resource global monitor controller may monitor all CRs in each CSI driver to make sure that all PVs have flushed the dirty data. The controller may additionally and/or alternatively perform and/or ensure that the snapshot creation time is recorded, an API call to resume write I/O for all PVs is issued.

In some approaches, a check may be performed on metadata of the different storage classes to determine whether a given storage volume supports a consistency group. For storage systems supporting the consistency group, create snapshot commands may be issued, with a consistency group option to the volumes. These commands may be of a type that would become apparent to one of ordinary skill in the art after reading the description herein. In one specific example, one or more of these commands may include a data storage command-line interface (DSCLI) command such as "mkflash-freeze" by INTERNATIONAL BUSINESS MACHINES CORPORATION (IBM). The storage systems may, in response thereto, be caused to block I/O operations to the volumes and create snapshots accordingly.

For any storage system not supporting the consistency group, in some approaches, the controller blocks I/O operations to the volumes, e.g., by issuing a command. In some other approaches, for such storage system(s), snapshot creation commands are sent to the volumes. The sequence of sending create snapshot commands with or without a consistency group option may be arranged to accelerate the creation of consistency group, in some approaches. For example, commands to predetermined types of storage systems may be arranged at the head of the queue, e.g., relatively low speed storage, relatively hot volumes, relatively big volumes, etc.

In some approaches, until successful acknowledgements of all the create snapshot commands with or without consistency group option are received, a wait may be performed. For a storage system that supports the consistency group, an instruction may be issued to resume I/O commands to storage systems. Storage systems then resume I/O operations to the corresponding volumes. This resume may be caused by issuing a command which may be of a type that would become apparent to one of ordinary skill in the art after reading the description herein. In one specific example, such a command may include a DSCLI unfreezeflash command.

In contrast, for a storage system not supporting a consistency group, the controller may resume I/O operations to the volumes. The snapshot customer resource global monitor controller sends acknowledge information to the application service that snapshot creation has been finished in a recorded time, e.g., completed at a specified timestamp. However, in response to a determination that any volume returns a failure to create snapshot or is determined to be not responding beyond a predefined timeout threshold, the creation fails. In response to a determination that one of the snapshots has failed to be created, failure paths of different predetermined scenarios may be created, e.g., where the failure paths may include the mitigating actions described elsewhere herein.

The data storage infrastructure 400 enables the creation of a snapshot for an application running in Kubernetes which is using PV from different storage vendors. This innovation collaborates with standard CSI drives for snapshot creation, and the application is able to dynamically add and/or remove PVs on demand.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A method comprising:

causing a persistent volume list for application services in a container orchestration system to be maintained, wherein a plurality of drivers maintain a plurality of persistent volumes in the different application services;

in response to receiving a request from a first application to create a snapshot of the persistent volumes in a first of the application services, identifying, within the persistent volume list, drivers, of the plurality of drivers, that maintain the persistent volumes belonging to the first application service;

causing the identified drivers to flush flawed data from the persistent volumes belonging to the first application service;

causing, subsequent to the flushing of the flawed data, the identified drivers to create snapshots of the persistent volumes belonging to the first application service;

recording a time that the snapshots for the persistent volumes belonging to the first application service are complete; and sending a first notification to the first application to acknowledge fulfillment of the request, wherein the first notification indicates the recorded time.

2. The method of claim 1, wherein the requested snapshot of the persistent volumes in the first application service comprises a combination of the snapshots of the persistent volumes belonging to the first application service created by the drivers, wherein a first subset of the persistent volumes belonging to the first application service exist across a plurality of different storage tiers on a first storage system, wherein a second subset of the persistent volumes belonging to the first application service exist on a second storage system.

3. The method of claim 1, further comprising:

causing input/output (I/O) operations to the persistent volumes belonging to the first application service to be blocked during the creations of the snapshots of the persistent volumes belonging to the first application service; and in response to a determination that the snapshots for the persistent volumes belonging to the first application service are complete, causing the I/O operations to resume.

4. The method of claim 1, wherein the flawed data includes a data set to be erased.

5. The method of claim 4, wherein the drivers are caused to flush the flawed data from the persistent volumes belonging to the first application service until a predetermined condition is met, wherein the predetermined condition includes: an amount of buffered data in the container orchestration system falling below a predefined threshold and/or a timeout threshold being reached.

6. The method of claim 4, wherein the flawed data includes additional data selected from the group consisting of: inaccurate data, inconsistent data, and incomplete data.

7. The method of claim 1, further comprising:

in response to a determination that a first of the snapshots of a first of the persistent volumes belonging to the first application service fails to be created, sending a second notification to the first application, wherein the second notification details the failure to complete the snapshot of the first persistent volume; and performing a mitigating action to correct the failure, wherein the mitigating action is selected from the group consisting of: increasing a flush timeout, allocating additional time to a predetermined threshold of time that snapshots of the first persistent volume are to be created in, recovering data of the first persistent volume, and migrating data of the first persistent volume to a second of the persistent volumes belonging to the first application service.

8. The method of claim 1, wherein the causing the persistent volume list for the application services in the container orchestration system to be maintained comprises:

instructing a persistent volume list manager component to observe and document data operations that occur on the persistent volumes in the first application service, wherein a storage abstract layer run on top of a storage vendor's driver includes the persistent volume list manager component, wherein the application services are configured to perform maintenance operations on persistent volumes belonging to the application services, the persistent volumes belonging to the application services including the persistent volumes in the first application service, wherein the maintenance operations are selected from the group consisting of: initializing, adding, deleting, and modifying.

9. The method of claim 1, further comprising:

storing, in a training set of data, information detailing the creations of the snapshots of the persistent volumes belonging to the first application service;

using the training set of data to train an artificial intelligence (AI) model to cause creation of snapshots of persistent volumes in a second application service; and in response to a determination that the AI model achieves at least a predetermined threshold of accuracy for causing creations of the snapshots of the persistent volumes in the second application service, deploying the trained AI model to manage snapshots of all persistent volumes in the container orchestration system.

10. A computer program product comprising:

one or more computer-readable storage media; and program instructions stored on the one or more storage media to perform operations comprising:

causing a persistent volume list for application services in a container orchestration system to be maintained, wherein a plurality of drivers maintain a plurality of persistent volumes in the different application services;

in response to receiving a request from a first application to create a snapshot of the persistent volumes in a first of the application services, identifying, within the persistent volume list, drivers, of the plurality of drivers, that maintain the persistent volumes belonging to the first application service;

causing the identified drivers to flush flawed data from the persistent volumes belonging to the first application service;

causing, subsequent to the flushing of the flawed data, the identified drivers to create snapshots of the persistent volumes belonging to the first application service;

recording a time that the snapshots for the persistent volumes belonging to the first application service are complete; and sending a first notification to the first application to acknowledge fulfillment of the request, wherein the first notification indicates the recorded time.

11. The computer program product of claim 10, wherein the requested snapshot of the persistent volumes in the first application service comprises a combination of the snapshots of the persistent volumes belonging to the first application service created by the drivers, wherein a first subset of the persistent volumes belonging to the first application service exist across a plurality of different storage tiers on a first storage system, wherein a second subset of the persistent volumes belonging to the first application service exist on a second storage system.

12. The computer program product of claim 10, wherein the operations further comprise:

causing input/output (I/O) operations to the persistent volumes belonging to the first application service to be blocked during the creations of the snapshots of the persistent volumes belonging to the first application service; and in response to a determination that the snapshots for the persistent volumes belonging to the first application service are complete, causing the I/O operations to resume.

13. The computer program product of claim 10, wherein the flawed data includes a data set to be erased.

14. The computer program product of claim 13, wherein the drivers are caused to flush the flawed data from the persistent volumes belonging to the first application service until a predetermined condition is met, wherein the predetermined condition includes: an amount of buffered data in the container orchestration system falling below a predefined threshold and/or a timeout threshold being reached.

15. The computer program product of claim 13, wherein the flawed data includes additional data selected from the group consisting of: inaccurate data, inconsistent data, and incomplete data.

16. The computer program product of claim 10, wherein the operations further comprise:

in response to a determination that a first of the snapshots of a first of the persistent volumes belonging to the first application service fails to be created, sending a second notification to the first application, wherein the second notification details the failure to complete the snapshot of the first persistent volume; and performing a mitigating action to correct the failure, wherein the mitigating action is selected from the group consisting of: increasing a flush timeout, allocating additional time to a predetermined threshold of time that snapshots of the first persistent volume are to be created in, recovering data of the first persistent volume, and migrating data of the first persistent volume to a second of the persistent volumes belonging to the first application service.

17. The computer program product of claim 10, wherein the causing the persistent volume list for the application services in the container orchestration system to be maintained comprises:

instructing a persistent volume list manager component to observe and document data operations that occur on the persistent volumes in the first application service, wherein a storage abstract layer run on top of a storage vendor's driver includes the persistent volume list manager component, wherein the application services are configured to perform maintenance operations on persistent volumes belonging to the application services, the persistent volumes belonging to the application services including the persistent volumes in the first application service, wherein the maintenance operations are selected from the group consisting of: initializing, adding, deleting, and modifying.

18. The computer program product of claim 10, wherein the operations further comprise:

storing, in a training set of data, information detailing the creations of the snapshots of the persistent volumes belonging to the first application service;

using the training set of data to train an artificial intelligence (AI) model to cause creation of snapshots of persistent volumes in a second application service; and in response to a determination that the AI model achieves at least a predetermined threshold of accuracy for causing creations of the snapshots of the persistent volumes in the second application service, deploying the trained AI model to manage snapshots of all persistent volumes in the container orchestration system.

19. A computer system comprising:

a processor set;

one or more computer-readable storage media; and program instructions stored on the one or more storage media to cause the processor set to perform operations comprising:

causing a persistent volume list for application services in a container orchestration system to be maintained, wherein a plurality of drivers maintain a plurality of persistent volumes in the different application services;

in response to receiving a request from a first application to create a snapshot of the persistent volumes in a first of the application services, identifying, within the persistent volume list, drivers, of the plurality of drivers, that maintain the persistent volumes belonging to the first application service;

causing the identified drivers to flush flawed data from the persistent volumes belonging to the first application service;

causing, subsequent to the flushing of the flawed data, the identified drivers to create snapshots of the persistent volumes belonging to the first application service;

recording a time that the snapshots for the persistent volumes belonging to the first application service are complete; and sending a first notification to the first application to acknowledge fulfillment of the request, wherein the first notification indicates the recorded time.

20. The computer system of claim 19, wherein the requested snapshot of the persistent volumes in the first application service comprises a combination of the snapshots of the persistent volumes belonging to the first application service created by the drivers, wherein a first subset of the persistent volumes belonging to the first application service exist across a plurality of different storage tiers on a first storage system, wherein a second subset of the persistent volumes belonging to the first application service exist on a second storage system.

* * * * *